J. P. Wigal.
Animal-Trap.
№ 73,418.        Patented Jan. 14, 1868.
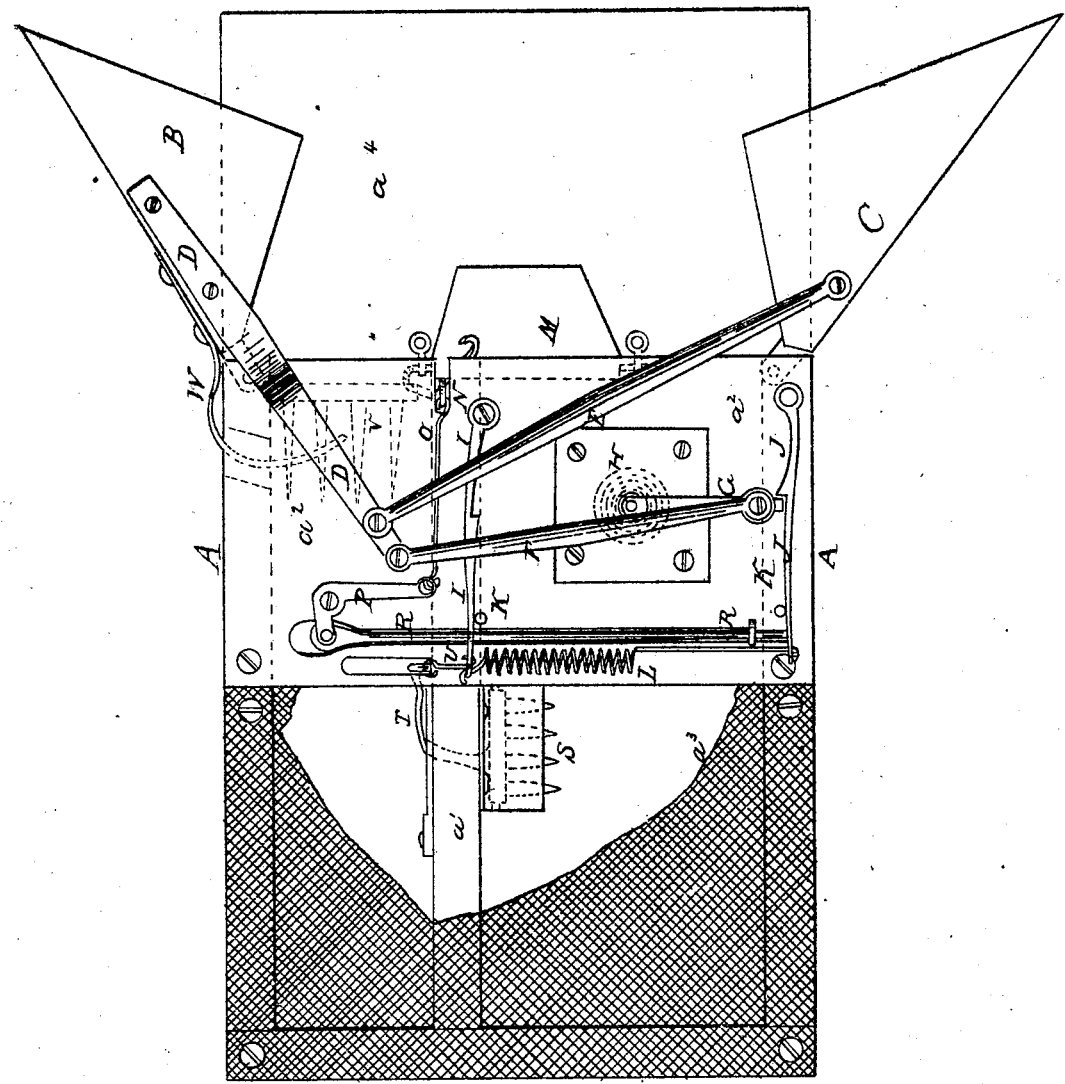
Witnesses:
W. C. Ashketter
Theo Fische
Inventor
Jas. P. Wigal
per Munn & Co
Attorneys.

United States Patent Office.

JAMES P. WIGAL, OF HENDERSON, KENTUCKY.

Letters Patent No. 73,418, dated January 14, 1868.

---

IMPROVED ANIMAL-TRAP.

---

The Schedule referred to in these Letters Patent and making part of the same.

---

TO ALL WHOM IT MAY CONCERN:

Be it known that I, JAMES P. WIGAL, of Henderson, in the county of Henderson, and State of Kentucky, have invented a new and useful Improvement in Animal-Traps; and I do hereby declare that the following is a full, clear, and exact description thereof, which will enable those skilled in the art to make and use the same, reference being had to the accompanying drawings, forming part of this specification, in which the figure is a top or plan view of my improved trap.

My invention has for its object to furnish an improved animal-trap, which shall be simple in construction, convenient and effective in operation, and not liable to get out of order; and it consists in the construction, combination, and arrangement of the various parts of the trap, as hereinafter more fully described.

A is the box of the trap, which is divided longitudinally into two unequal compartments by the partition $a$. The forward part of the box A is covered with a close cover, $a^2$, and the rear part with a wire-cloth or other grating, $a^3$. The bottom of the box A extends out in front, so as to form a platform, $a^4$. B and C are triangular wings, which are hinged at the corners of the forward end of the box A, and which, when closed, form a triangular chamber at the forward end of the box. D is an arm, one end of which is rigidly attached to the upper part of the wing B. E is a connecting-rod, one end of which is pivoted to the upper part of the wing C, and its other end to the arm D, near its end, as shown in the drawing. To the free end of the arm D is pivoted one end of the connecting-rod F, the other end of which is pivoted to the crank-pin of the crank G, the shaft of which passes through the cover $a^2$ of the box A, and has a spring, H, coiled around and attached to it. I and J are lever-catches, the forward ends of which are pivoted to the cover $a^2$, near its forward edge, in such positions that the crank G, as it revolves, will strike against and catch upon the shoulders $i$ and $j$, formed upon the said lever-catches I and J. The rear ends of the arms or levers I and J are connected to each other, and held up against the stop-pins K by the spiral spring L, as shown in the figure. M is a small platform, pivoted at its rear edge just beneath the bait-hook. To the platform M, or to the pivoting-bar of said platform, is attached an arm, N, the free end of which extends up through a slot in the forward edge of the cover $a^2$. O is a connecting-wire or rod, one end of which is attached to the end of the arm N, and its other end to the end of the long arm of the bent or elbow-lever P. The lever P is pivoted at its angle to the cover $a^2$, and the end of its short arm is pivoted to the end of the bar R, which works longitudinally in a groove in the cover $a^2$, and the other end of which rests against the lever-catch J. S is a drop-gate, which closes the passage-way through the partition $a^1$, and to which is attached an arm, T, the upper end of which is connected with the lever-catch I by a rod or wire, U. V is a drop-gate, which closes the passage-way from the platform $a^4$ into the first or smaller compartment of the box A, and which, when the trap is set, is held closed or locked by the curved arm W, attached to the wing B, and which passes in through the side of the box A above the gate V.

In using the trap, the coil spring H is wound up by turning the crank G, and it is set by allowing the said crank to catch upon and be held by the shoulder $j$ of the lever-catch J. The animal seeking to reach the bait steps upon and presses down the pivoted platform M. This, by means of the arm N, connecting-rod O, bent lever P, and bar R, pushes back the lever-catch J and releases the crank G. The coil spring H immediately revolves the crank a half revolution, till it catches upon the shoulder $i$ of the lever-catch I. This movement of the crank G, by means of the connecting-rods F and E and arm D, closes the wings B C, and shuts the animal into the triangular chamber formed by said wings. The same movement withdraws the curved arm W, unfastening the drop-gate V, through which the animal rushes in seeking to escape. From this compartment he passes into the larger compartment of the box A by raising the gate S. The gate S, in rising by means of the arm T and connecting-wire or rod U, draws the lever-catch I back, releasing the crank G, which is revolved a half revolution by the coil spring H, again setting the trap for another animal.

I claim as new, and desire to secure by Letters Patent—

1. The combination of the coil spring H, crank G, lever-catches I and J, spiral spring L, or its equivalent, connecting-rods E and F, and arm D with each other and with the wings B and C, substantially as herein shown and described, and for the purpose set forth.

2. The combination of the pivoted platform M, arm N, connecting-rod or wire O, elbow-lever P, and bar R with each other and with the lever-catch J, for the purpose of springing the trap, substantially as herein shown and described.

3. The combination of the arm T and connecting-rod or wire U with the drop-gate S and lever-catch I, for the purpose of resetting the trap, substantially as herein shown and described.

4. The combination of the curved arm W with the wing B and drop-gate V, substantially as herein shown and described, and for the purpose set forth.

JAMES P. WIGAL.

Witnesses:
LAFAYETTE CLORE,
W. P. ROBINSON.